(12) United States Patent
Poulin et al.

(10) Patent No.: US 11,996,932 B2
(45) Date of Patent: May 28, 2024

(54) ACTIVE-ACTIVE TDM PW WITH ASYMMETRY CONTROL

(71) Applicant: Nokia Solutions and Networks Oy, Espoo (FI)

(72) Inventors: Andre Poulin, Quebec (CA); Chad McCarthy, Ottawa (CA); Wayne Groff, Kanata (CA); Kin Yee Wong, Ottawa (CA)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 130 days.

(21) Appl. No.: 17/552,591

(22) Filed: Dec. 16, 2021

(65) Prior Publication Data
US 2023/0198647 A1 Jun. 22, 2023

(51) Int. Cl.
*H04L 45/24* (2022.01)
*H04J 3/06* (2006.01)
*H04L 47/283* (2022.01)
*H04L 47/34* (2022.01)

(52) U.S. Cl.
CPC .......... *H04J 3/0629* (2013.01); *H04L 47/283* (2013.01); *H04L 47/34* (2013.01); *H04L 45/24* (2013.01)

(58) Field of Classification Search
CPC ......... H04L 45/24; H04L 45/22; H04L 47/34; H04L 47/283; H04L 2012/6489; H04L 2012/5648; H04J 3/0629
USPC .......................................... 375/211, 224, 354
See application file for complete search history.

(56) References Cited

U.S. PATENT DOCUMENTS

| 6,434,606 | B1 * | 8/2002 | Borella ................. H04L 49/30 711/148 |
| 9,065,748 | B2 | 6/2015 | Wong et al. |
| 9,602,419 | B2 | 3/2017 | Wong et al. |
| 9,871,720 | B1 * | 1/2018 | Tillotson ............... H04L 45/306 |
| 10,475,456 | B1 * | 11/2019 | Bhatia ................... G10L 19/005 |
| 10,601,611 | B1 | 3/2020 | Poulin et al. |

(Continued)

OTHER PUBLICATIONS

Ramon, B. et al., "Teleprotection solutions with guaranteed performance using packet switched wide area communication networks," 2017 70th Annual Conference for Protective Relay Engineers (CPRE). IEEE, pp. 1-6, Apr. 3, 2017.

(Continued)

*Primary Examiner* — Emmanuel Bayard
(74) *Attorney, Agent, or Firm* — Harness, Dickey & Pierce, P.L.C.

(57) ABSTRACT

A method for enabling enable use of multiple active paths for TDM traffic over a packet switched network, comprises: receiving at least two copies of a replicated packet including TDM information via at least two paths through the packet switched network, the at least two copies of the replicated packet including at least a first copy of the replicated packet received via a first of the at least two paths, and a second copy of the replicated packet received via a second of the at least two paths; selecting a copy of the replicated packet from among the at least two copies of the replicated packet; inputting the selected copy of the replicated packet to a jitter buffer; discarding unselected ones of the at least two copies of the replicated packet; and outputting the selected copy of the replicated packet from the jitter buffer to a TDM endpoint device.

20 Claims, 11 Drawing Sheets

(56) References Cited

U.S. PATENT DOCUMENTS

| | | | |
|---|---|---|---|
| 11,595,119 B2* | 2/2023 | Annavajjala | H04J 3/14 |
| 2009/0010248 A1* | 1/2009 | Kanai | H04L 45/24 |
| | | | 370/352 |
| 2010/0208582 A1* | 8/2010 | Poulin | H04L 69/40 |
| | | | 370/503 |
| 2010/0220609 A1* | 9/2010 | Lobzakov | H04L 43/0852 |
| | | | 370/252 |
| 2010/0235593 A1* | 9/2010 | Yadav | H04L 45/28 |
| | | | 711/161 |
| 2011/0044288 A1* | 2/2011 | Nagasawa | H04W 36/26 |
| | | | 370/331 |
| 2013/0114593 A1 | 5/2013 | Jabr et al. | |
| 2013/0132789 A1* | 5/2013 | Watford | H04L 1/08 |
| | | | 714/752 |
| 2014/0105033 A1 | 4/2014 | Vasseur et al. | |
| 2015/0026542 A1* | 1/2015 | Brennum | H04L 65/764 |
| | | | 714/776 |
| 2015/0172154 A1 | 6/2015 | Wong et al. | |
| 2019/0089642 A1* | 3/2019 | Srinivasan | H04L 43/087 |
| 2019/0280983 A1* | 9/2019 | Thubert | H04L 47/283 |
| 2023/0127468 A1* | 4/2023 | Kondapavuluru | H04L 63/164 |
| | | | 370/392 |

OTHER PUBLICATIONS

Extended European Search Report dated Apr. 20, 2023.
A. Vainshtein et al., "Structure-Agnostic Time Division Multiplexing (TDM) over Packet (SAToP)," RFC 4553, Jun. 2006.
A. Vainshtein et al., "Structure-Aware Time Division Multiplexed (TDM) Circuit Emulation Service over Packet Switched Network (CESoPSN)" RFC 5086, Dec. 2007.
"Implementation Agreement for the Emulation of PDH circuits over Metro Ethernet Networks," Metro Ethernet Forum (MEF) 8, Oct. 2004.

* cited by examiner

ACTIVE-ACTIVE TDM PW WITH ASYMMETRY CONTROL

TECHNICAL FIELD

One or more example embodiments relate to telecommunications networks, such as time-division multiplexing (TDM) pseudowire (PW) interconnected networks.

BACKGROUND

Services and/or equipment in telecommunications networks may require symmetrical communication, or identical latency in both directions between two sites. For example, current differential relay monitoring for teleprotection purposes requires symmetrical communication channels for operation.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

One or more example embodiments may provide hitless service delivery of TDM traffic and/or minimize asymmetry in services, such as a time-division multiplexing (TDM) service, even with the failure of any one or more network links, as long as one network link is available.

According to at least one example embodiment, with multiple replicates of a packet (e.g., a TDM packet), sent across the multiple network connections, a combiner buffers and chooses a single copy of the replicated packet for each sequence number.

To maintain service symmetry, the combiner takes into account that each path may have a different latency and/or each packet may experience different jitter when selecting a packet from a given path.

At least one example embodiment provides a network element to enable use of multiple active paths for time division multiplexing (TDM) traffic over a packet switched network. The network element includes at least one processor and at least one memory including computer program code. The at least one memory and the computer program code are configured to, with the at least one processor, cause the network element to: receive at least two copies of a replicated packet including TDM information via at least two paths through the packet switched network, the at least two copies of the replicated packet including at least a first copy of the replicated packet received via a first of the at least two paths, and a second copy of the replicated packet received via a second of the at least two paths; select a copy of the replicated packet from among the at least two copies of the replicated packet; input the selected copy of the replicated packet to a jitter buffer; discard unselected ones of the at least two copies of the replicated packet; and output the selected copy of the replicated packet from the jitter buffer to a TDM endpoint device.

At least one example embodiment provides a network element to enable use of multiple active paths for time division multiplexing (TDM) traffic over a packet switched network, the network element comprising: means for receiving at least two copies of a replicated packet including TDM information via at least two paths through the packet switched network, the at least two copies of the replicated packet including at least a first copy of the replicated packet received via a first of the at least two paths, and a second copy of the replicated packet received via a second of the at least two paths; means for selecting a copy of the replicated packet from among the at least two copies of the replicated packet; means for inputting the selected copy of the replicated packet to a jitter buffer; means for discarding unselected ones of the at least two copies of the replicated packet; and means for outputting the selected copy of the replicated packet from the jitter buffer to a TDM endpoint device.

At least one other example embodiment provides a method for enabling enable use of multiple active paths for time division multiplexing (TDM) traffic over a packet switched network, the method comprising: receiving at least two copies of a replicated packet including TDM information via at least two paths through the packet switched network, the at least two copies of the replicated packet including at least a first copy of the replicated packet received via a first of the at least two paths, and a second copy of the replicated packet received via a second of the at least two paths; selecting a copy of the replicated packet from among the at least two copies of the replicated packet; inputting the selected copy of the replicated packet to a jitter buffer; discarding unselected ones of the at least two copies of the replicated packet; and outputting the selected copy of the replicated packet from the jitter buffer to a TDM endpoint device.

At least one other example embodiment provides a non-transitory computer-readable medium storing computer-executable instructions that, when executed by or at a network element (or one or more processors included therein), cause the network element to perform a method for enabling enable use of multiple active paths for time division multiplexing (TDM) traffic over a packet switched network, the method comprising: receiving at least two copies of a replicated packet including TDM information via at least two paths through the packet switched network, the at least two copies of the replicated packet including at least a first copy of the replicated packet received via a first of the at least two paths, and a second copy of the replicated packet received via a second of the at least two paths; selecting a copy of the replicated packet from among the at least two copies of the replicated packet; inputting the selected copy of the replicated packet to a jitter buffer; discarding unselected ones of the at least two copies of the replicated packet; and outputting the selected copy of the replicated packet from the jitter buffer to a TDM endpoint device.

According to one or more example embodiments, the copy of the replicated packet may be selected based on a time of receipt of the at least two copies of the replicated packet.

The first copy of the replicated packet may be received prior to the second copy of the replicated packet, and the first copy of the replicated packet may be selected as the selected copy of the replicated packet.

The first copy of the replicated packet is a first instance of the replicated packet received at the network element, and the first copy of the replicated packet may be selected as the selected copy of the replicated packet.

The copy of the replicated packet may be selected, from among the at least two copies of the replicated packet, after receipt of all of the at least two copies of the replicated packet.

Each of the at least two copies of the replicated packet may have the same sequence number.

At least the first copy of the replicated packet may include a shim header, the shim header including at least one of a number of the at least two paths through the packet switched network, a list of unique path identifiers for the at least two paths through the packet switched network, a unique node identifier (UNI) for a node having transmitted the first copy of the replicated packet, and a current state of the node having transmitted the first copy of the replicated packet.

Whether the first of the at least two paths has a highest latency among the at least two paths may be determined, the first copy of the replicated packet may be buffered in response to determining that the first of the at least two paths does not have the highest latency among the at least two paths, whether the buffered first copy of the replicated packet is the first instance of the replicated packet received at the network element may be determined, and the buffered first copy of the replicated packet may be selected as the selected copy in response to determining that the buffered first copy of the replicated packet is the first instance of the replicated packet received at the network element.

The first copy of the replicated packet may be buffered for a time equal to a difference between the highest latency and the minimum latency among the at least two paths.

Whether the first of the at least two paths has a highest latency among the at least two paths may be determined, whether the first copy of the replicated packet is the first instance of the replicated packet received at the network element may be determined in response to determining that the first of the at least two paths has the highest latency among the at least two paths, and the first copy of the replicated packet may be selected as the selected copy in response to determining that the first copy of the replicated packet is the first instance of the replicated packet received at the network element.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
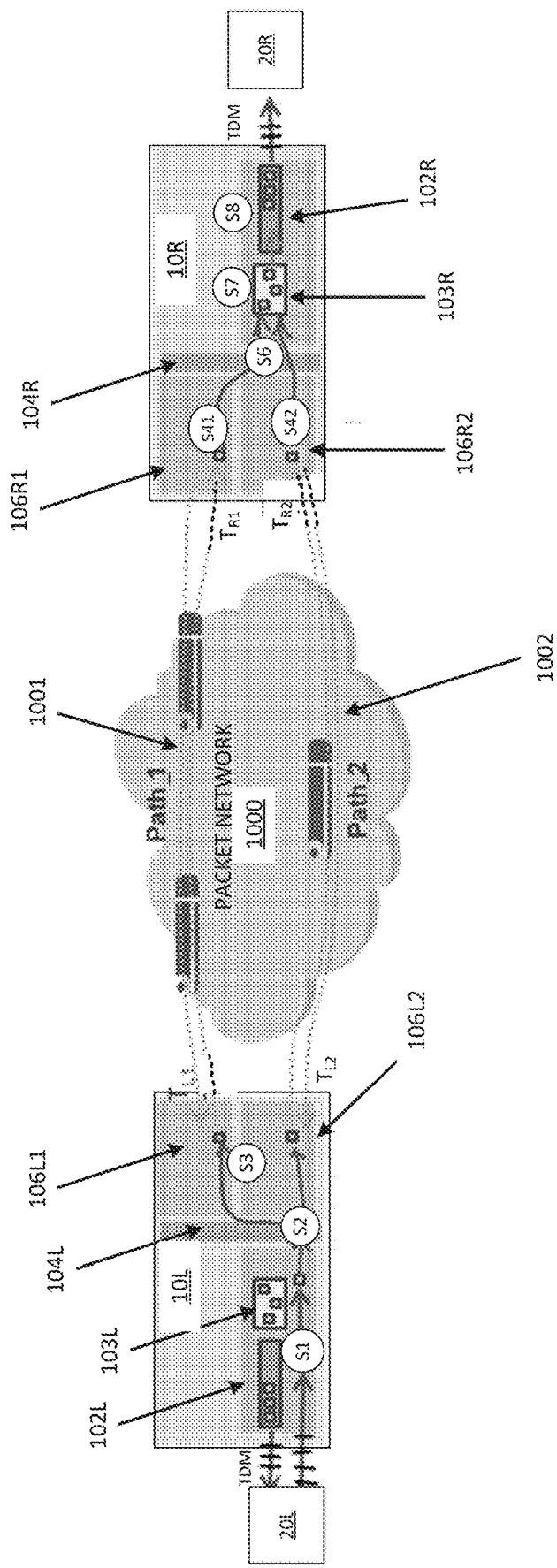
FIG. 1 illustrates a portion of a TDM PW network including an embedded signal flow, according to one or more example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a function or network element such as a network node (or node) or router, it should be understood that one or more example embodiments discussed herein may be performed by a component (e.g., combiner, jitter buffer, line card, etc.) and/or one or more processors (or processing circuitry) at the applicable device, apparatus or system. For example, according to one or more example embodiments, at least one memory may include or store computer program code, and the at least one memory and the computer program code may be configured to, with at least one processor, cause the network element to perform the operations discussed herein. Similarly, while one or more example embodiments may be described from the perspective of a component (e.g., combiner, jitter buffer, line card, etc.), or state thereof, of a node or other network element, it should be understood that the functions, operations and/or states may be applicable to the larger node or network element.

As discussed herein, the term "mechanism," in addition to its plain and ordinary meaning, may refer to methods, apparatuses and/or non-transitory computer readable storage mediums where applicable.

One or more example embodiments may utilize a master-slave relationship between routers. The master-slave relationship allows the node (or router) designated as the master to control aspects of the state transitions and other aspects of the node or nodes designated as slaves.

As discussed herein, the terminology "one or more" and "at least one" may be used interchangeably.

It will be appreciated that a number of example embodiments may be used in combination.

Legacy time division multiplexing (TDM) services over packet networks may be used in carrier and/or enterprise networks. And there is a great amount of older equipment that will remain in the network and needs connectivity across the network. An example of a legacy TDM service is teleprotection, which is useful in operating and maintaining a reliable, robust, and safe electrical power grid. Teleprotection is described in more detail in U.S. Patent Application Publication No. 2015/0172154, the entire contents of which are incorporated herein by reference.

Older TDM transport networks like Synchronous Digital Hierarchy (SDH)/Synchronous Optical Networks (SONETs) are being decommissioned and replaced with packet networks for a variety of reasons (e.g., end-of-life, cost savings, space savings, desire to converge to higher bandwidth packet network, etc.). Legacy TDM interfaces may include, for example, DS1/DS3/E1/E3, RS-232, C37.92, G.703, X.21, V.35, etc. Even though these legacy interfaces are for legacy applications, the TDM interfaces are still relatively important in terms of high availability and network resilience.

Popular implementations of TDM services over packet networks are based on Internet Engineering Task Force (IETF) RFC4553 and RFC5086, and Metro Ethernet Forum (MEF) MEF.8, the entire contents of each of which are incorporated herein by reference. These specifications detail methods of TDM packetization with overhead bytes and signaling.

Remote boxes (e.g., teleprotection devices or the like) with TDM interfaces are connected via a packet network, which is for example based on Ethernet or Internet Protocol (IP). If a single connection provides connectivity between the two remote boxes with TDM interfaces, then the packets with the TDM data may not reach the destination if the single connection fails. As a result, the TDM service effectively goes down. To improve resiliency, two connections (e.g., a primary and a backup) may be established. If the primary connection fails, then the backup may activate for the TDM service. However, the protection switch from the failed network connection to the backup network connection occurs over a period of time, and by the time the TDM packets are available at the far-end device, the jitter buffer associated with the TDM service may have been underrun and the service may require a restart. Even though the network may automatically recover, the resulting traffic hit that is introduced may be unacceptable for the external equipment and associated service that it provides (e.g., traffic control, power utility operations, etc.).

One or more example embodiments provide a mechanism for enabling multiple active redundant paths in connection with, for example, a TDM Pseudo Wire (PW) service, wherein all active redundant paths are actively sending packets for the TDM PW service over a packet network.

At least one example embodiment provides methods, devices and non-transitory computer-readable storage mediums to coordinate TDM service data over multiple active network connections to reduce the likelihood of failure of the TDM service (and traffic interruption) even while utilizing packets from different network connections. To this end, one or more example embodiments provide a hitless service delivery of the TDM traffic, even with the failure of any one or more network links, as long as one network link is available.

At startup, or in the event of a failure, one or more example embodiments also provide mechanisms for startup and/or recovery after failure of one or more active multipaths.

According to one or more example embodiments, rather than designing primary and back-up connections, multiple paths (also referred to herein as links or connections) are set up across the packet network and all paths are actively used to transmit replicated TDM packet traffic to the far end (destination) node (or router).

At the packetization end (TDM in, packets out), the TDM packet is replicated to simultaneously transmit copies of a given packet over all redundant paths. As long as a single path is up, at least one copy of the packet will be received at the other end.

At the far end, the destination node receives one or more copies of each TDM packet depending on the number of available paths. Each packet includes header information such as a sequence number, which identifies the order of packets (or bytes included therein) in the transmitted data flow such that the transmitted data may be reconstructed at the destination. In a more specific example, the sequence number is used to provide an orderly mechanism to process the flow of TDM packets from the network paths to filter down to a single instance, which is input to a jitter buffer, and ultimately to the output TDM port. Each packet has a sequence number, and copies of a same packet have the same sequence number.

One or more example embodiments may be implemented at nodes using, for example, finite state machines (FSMs) or the like.

In some instances, multiple network elements (e.g., nodes), or components thereof, may be shown in the figures, but only one of the network elements, or components thereof, is described. It should be understood, however, that descriptions provided with regard one network element, or component thereof, apply equally to the other network element, or component thereof.

FIG. 1 illustrates a portion of a TDM PW network including an embedded signal flow according to one or more example embodiments.

As shown in FIG. 1, the network includes multiple paths through a packet network connecting a node (or router) 10L and a node (or router) 10R. In some instances, node 10L may be discussed as being a source node, and node 10R may be discussed as being a destination node. However, it should be understood that node 10R may be a source node and node 10L may be a destination node. Node 10L is connected (e.g., directly or indirectly) to endpoint device 20L and node 10R is connected (e.g., directly or incorrectly) to endpoint device 20R. In one example, endpoint devices 20L and 20R may be teleprotection devices, and may be described as such for example purposes. However, example embodiments should not be limited to these examples.

For example purposes, the network shown in FIG. 1 will be initially described with regard to a flow in which a (e.g., TDM) packet is replicated and copies of the replicated packets are received over both paths. Example embodiments should not, however, be limited to this example.

Referring to FIG. 1, node 10L includes line cards 106L1 and 106L2, switch fabric 104L, combiner (or pre-buffer) 103L and a jitter buffer 102L. Although not shown, node 10L may also include a packetization processor and/or a TDM interworking function.

Node 10R includes line cards 106R1 and 106R2, switch fabric 104R, combiner (or pre-buffer) 103R and a jitter buffer 102R. Although not shown, node 10R may also include a packetization processor and/or a TDM interworking function.

In the example shown in FIG. 1, node 10L and node 10R are connected via two paths Path_1 and Path_2 through network 1000. However, example embodiments should not be limited to this example. Rather, node 10L and node 10R may be connected through any number of paths through network 1000. In FIG. 1, the latency from node 10L to node 10R on path Path_1 is designated TR1, the latency from node 10L to node 10R on path Path_2 is designated TR2. The latency from node 10R to node 10L on path Path_1 is designated TL1, and the latency from node 10R to node 10L on path Path_2 is designated TL2.

In example operation, measurements (or measurement information) generated by the endpoint device 20L are output to node 10L, which packetizes (e.g., via the packetization processor) the measurement information (S1). In addition to a portion of the information, as mentioned above, each TDM packet includes header information such as, for example, a sequence number and a shim header. The shim header will be discussed in more detail later.

At S2, the switch fabric replicates each packet, and outputs a copy of each packet to each one of the line cards 106L1 and 106L2.

At S3, the line card 106L1 transmits the received copy of each packet through the network 1000 on path Path_1. Also at S3, the line card 106L2 transmits the received copy of each packet through the network 1000 on path Path_2.

After traversing the network 1000 through paths Path_1 and Path_2, at S41 the line card 106R1 at node 10R receives copies of packets transmitted via path Path_1, and at S42, the line card 106R2 receives copies of packets transmitted via path Path_2.

At S6, the line cards 106R1 and 106R2 output the received packets through to the switch fabric 104R and into the combiner (or pre-buffer) 103R.

At S7, the combiner 103R processes and/or select one of the copies each replicated packet, and outputs the selected copy to the jitter buffer 102R. The combiner 103R may drop the remaining copies of the replicated packets.

At S8, the jitter buffer 102R then buffers the incoming packets. Based on the system clock, the buffered packets are played out the egress TDM interface to the endpoint device.

According to one or more example embodiments, the combiner 103R may help ensure proper flow of TDM packets towards the TDM access port via the jitter buffer 102R. Because latencies and/or jitter associated with each path (e.g., Path_1 and Path_2 in FIG. 1) between node 10L and node 10R may differ, copies of the same packets transmitted via different paths may arrive at the combiner 103R at different times, out of order (misordered), or may not arrive at all (missing or dropped packets). The combiner 103R may select a packet (e.g., the "best" packet or copy thereof) with a given sequence number, and send the selected packet to the jitter buffer 102R. Other copies of the same packet, which may have arrived or arrive thereafter, may be discarded. According to at least some example embodiments, the configured paths (e.g., Path_1 and Path_2 in FIG. 1) through the network 1000 are consider active, since the packets used for the TDM service may be sent and received over either of the paths.

According to one or more example embodiments, the combiner 103R may select a copy of a packet according to one or more different methodologies. The methods may depend on, for example, desired service characteristics, such as maintaining service latency symmetry, providing fastest initial service startup, providing fastest data recovery after failure, data integrity, or the like.

In some applications, ensuring symmetry of the TDM service (latency for packets in one direction equals the latency in the opposite direction) is relatively important at least because the existence of excessive asymmetry may exceed the limits acceptable to the application that is using the TDM service. For example, a teleprotection relay in power utilities may rely on symmetric TDM service, and may experience false trips if the limits of asymmetry are exceeded.

One or more example embodiments provide mechanisms to control asymmetry in TDM services. In one example, the combiner at a given node may ensure symmetry in TDM systems in, for example, TDM systems in which respective paths have different latencies and each packet experiences different levels of jitter.

In most instances, example embodiments will be discussed herein with regard to two active redundant paths. However, example embodiments should not be limited to these examples. Rather, example embodiments may be applicable to any number of active redundant paths.

For example purposes, methods according to example embodiments will be discussed with regard to the network shown in FIG. 1, and with regard to a single replicated packet (replicated copy of a packet that has the same sequence number as other copies of the packet). It should be understood, however, that example embodiments should not be limited to these examples. It should also be understood that, where applicable, example embodiments discussed herein may be performed for each replicated packet.

Figure 2:
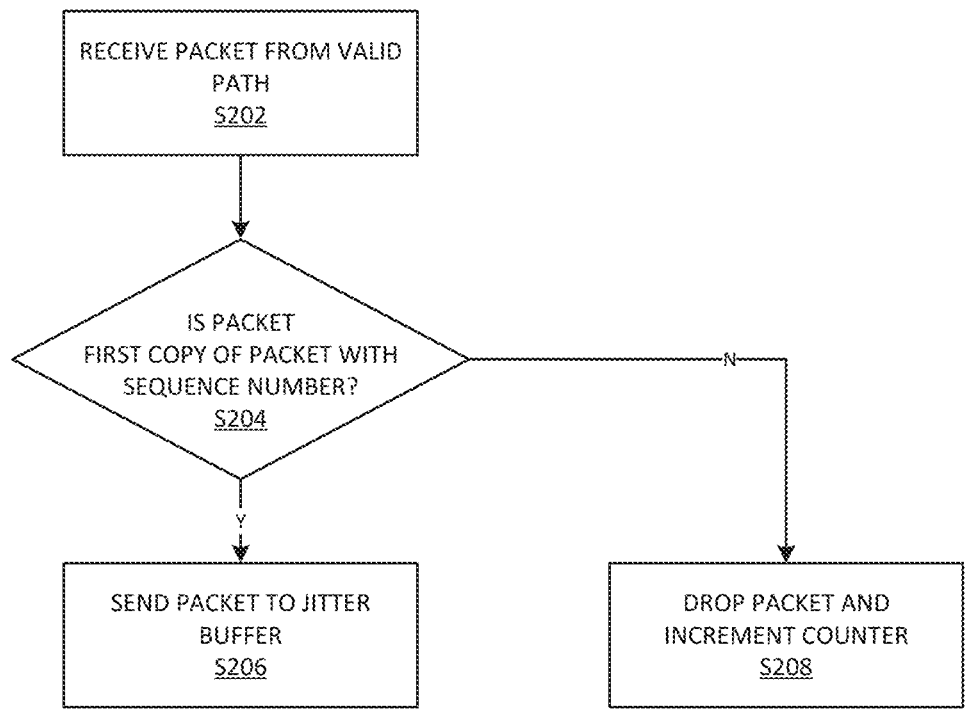
FIG. 2 is a flow chart illustrating a method according to one or more example embodiments.

FIG. 2 is a flow chart illustrating a method for controlling asymmetry in a TDM system, according to one or more example embodiments.

The example embodiment shown in FIG. 2 may sometimes be referred as the "fastest packet method." In this example embodiment, as TDM packets are received over a respective path, the combiner outputs the earliest arriving packet for a given sequence number (earliest arriving copy of a given packet), from among a sequence of packets, to the jitter buffer 102R. The combiner 103R then drops or discards other copies of the packet with the same sequence number. The combiner 103R may repeat these steps iteratively for each TDM packet with subsequent sequence numbers.

In more detail with regard to FIG. 2, at S202 the combiner 103R receives a TDM packet having a sequence number over a valid path (e.g., Path_1 or Path_2).

At S204, the combiner 103R determines whether the received packet is the first TDM packet to arrive with that sequence number (first copy of a TDM packet to arrive). In one example, the combiner 103R determines whether the received packet is the first TDM packet to arrive with the sequence number by performing a check of the previously received sequence numbers in a sequence of packets and/or anticipate the upcoming sequence number(s) to be received.

If the TDM packet is the first to arrive with the given sequence number, then at S206 the combiner 103R sends the received TDM packet to the jitter buffer 102R.

Returning to S204, if the TDM packet is not the first to arrive with the given sequence number (a packet with the given sequence number has already been received via another path), then at S208 the combiner 103R drops the TDM packet and increments the counter. The counter counts the duplicate sequence number drop, which is normal operation with multiple active paths.

ADC analysis may be performed each time the service starts. For example, ADC analysis may be performed the first time the service is up or after jitter buffer underrun or overrun situations.

The jitter buffer 102R may perform Asymmetry Delay Compensation (ADC) analysis and provide adjustments as necessary (e.g., in the startup mode), for example, by resetting the jitter buffer latency. The jitter buffer 102R may then enter normal mode in which the packets are output for further processing (e.g., to a teleprotection device). Example methods for ADC analysis, and use thereof, are described in U.S. Patent Application Publication No. 2015/0172154, U.S. Pat. No. 9,602,419 and U.S. Pat. No. 10,601,611, the entire contents of each of which are incorporated herein by reference. The entire contents of U.S. Pat. No. 9,065,748 are also incorporated herein by reference. ADC analysis may be performed each time the service starts. For example, ADC analysis may be performed the first time the service is up or after jitter buffer underrun or overrun situations.

According to one or more example embodiments, the size of the jitter buffer 102R may be configured, or automatically set, to a value to accommodate the maximum latency difference among paths between nodes. In the example shown in FIG. 2, the size of the jitter buffer 102R may be set (and/or adjusted) to a value greater than the latency difference between paths Path_1 and Path_2 through the network 1000. In an example in which more than two paths are present, the size of the jitter buffer 102R may be set to the original/default size+[2*maximum differential latency] between the respective paths through the network.

Figure 3:
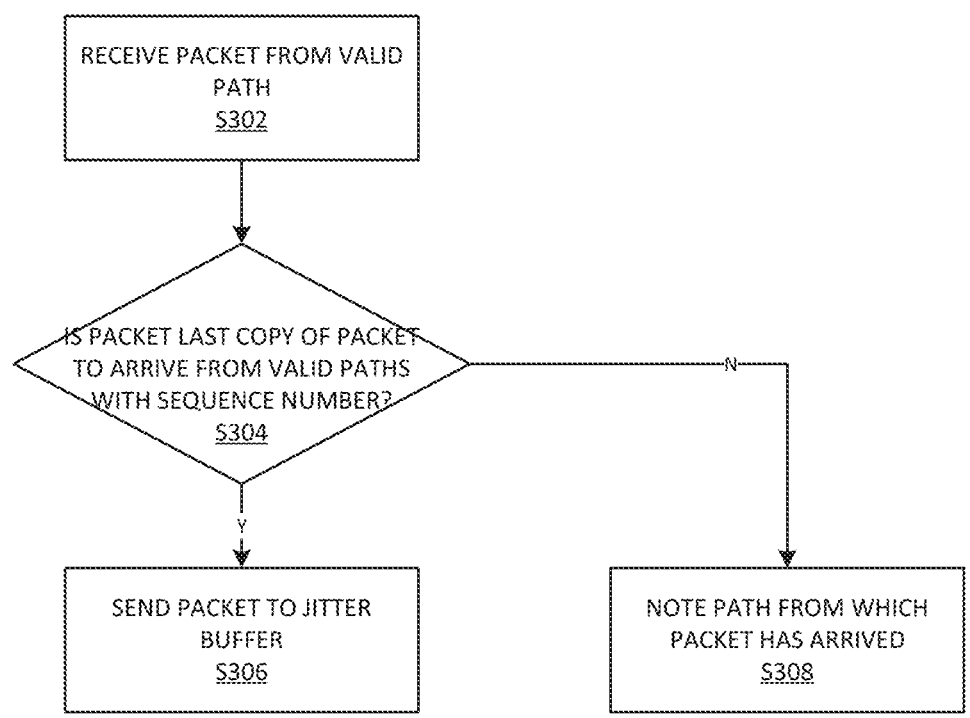
FIG. 3 is a flow chart illustrating another method according to one or more example embodiments.

FIG. 3 is a flow chart illustrating another method for controlling asymmetry in a TDM system, according to one or more example embodiments.

In this example, (sometimes referred to as the "all replicated packets received method"), for each received TDM packet, the combiner sends a copy of the packet to the jitter buffer when a copy of the packet has been received on each network path, while dropping the other copies of the packet.

In more detail with regard to FIG. 3, at S302 the combiner 103R receives a copy of a TDM packet on, for example, path Path_1.

At S304, the combiner 103R determines whether the copy of the TDM packet has already been received on path Path_2. In an example embodiment in which more than two paths are present, the combiner 103R may determine whether copies of the TDM packet have already been received on all other paths, thereby making the copy of the packet received on path Path_1 the last of the transmitted copies of the TDM packet received at the combiner 103R.

If the received copy of the TDM packet has already been received at the combiner 103R on all other paths (e.g., Path_2), then at S306 the combiner 103R sends the copy of the TDM packet received on path Path_1 to the jitter buffer 102R.

Returning to S304, if the copy of the received TDM packet has not yet been received on all other paths (and is not the last TDM packet to arrive with the given sequence number), then the combiner 103R notes the path over which the copy of the TDM packet arrived (e.g., Path_1), and may buffer or discard the received TDM packet.

As with the example shown in FIG. 2, the jitter buffer 102R may perform ADC analysis and provide adjustments as necessary in the startup mode, and then enter the normal mode. Also as discussed above with regard to FIG. 2, the size of the jitter buffer 102R may be configured or automatically set to, for example, the original/default size+[2*maximum differential latency] between the respective paths through the network.

Figure 4:
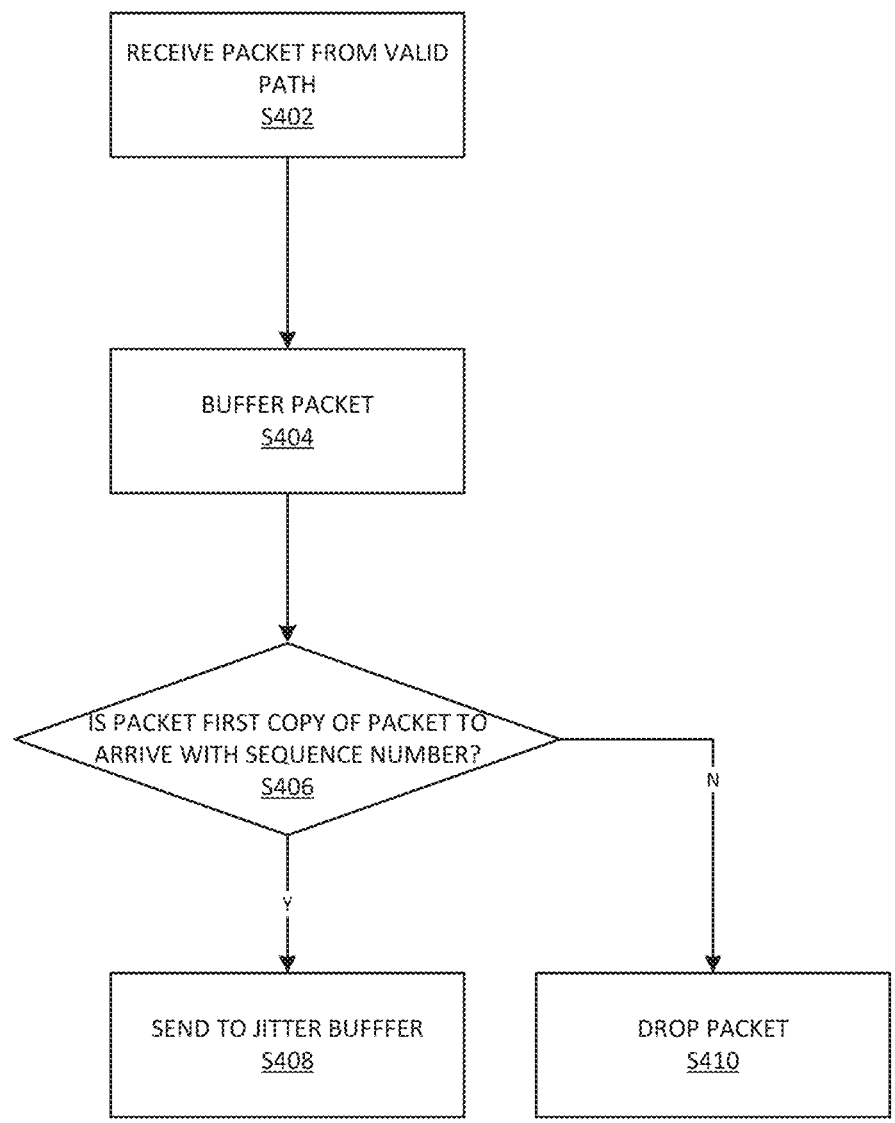
FIG. 4 is a flow chart illustrating another method according to one or more example embodiments.

FIG. 4 is a flow chart illustrating another method for controlling asymmetry in a TDM system, according to one or more example embodiments.

The example embodiment shown in FIG. 4 may sometimes be referred to as the "fixed buffering method." In this example, a configurable setting for a fixed buffering in terms of time or number of packets may be used at the combiner, thereby ensuring that the buffer is larger than the maximum latency difference between the paths. In one example, the maximum latency difference between the paths may be determined based on sent and receive timestamps for received packets.

In one example, each packet on each path may contain a shim header including, among other things, a transmit timestamp. In this case, the receive timestamp for each received packet may be observed, and the combiner may calculate the latency on each path as well as the differential delay. The shim header will be discussed in more detail later.

In this case, the combiner 103R buffers received copies of a TDM packet for a time sufficient to allow for copies of the packet to be received on each path. The combiner then sends the first arriving copy of the TDM packet to the jitter buffer, while dropping or discarding the other copies of the packet.

In more detail with regard to FIG. 4, at S402 the combiner 103R receives a copy of a TDM packet via a valid path.

At S404, the combiner 103R buffers the received TDM packet. As mentioned above, the combiner 103R sets an internal fixed buffer (e.g., in terms of time or number of packets) such that the buffer size is greater than the maximum latency difference between the paths between node 10L and 10R.

Upon expiration of the fixed buffer period, at S406 the combiner 103R determines whether the received copy of the TDM packet is the first copy of the TDM packet to arrive at the node 10R.

If the combiner 103R determines that the copy of the TDM packet is the first to arrive, then at S408 the combiner 103R forwards the copy of the TDM packet to the jitter buffer 102R.

Returning to S406, if the combiner 103R determines that the TDM packet is not the first copy of the TDM packet to arrive, then at S410 the combiner 103R drops or discards the copy of the TDM packet.

The jitter buffer 102R then performs ADC analysis and provides adjustments as necessary in the startup mode, and then enters normal mode, as discussed above.

Figure 5:
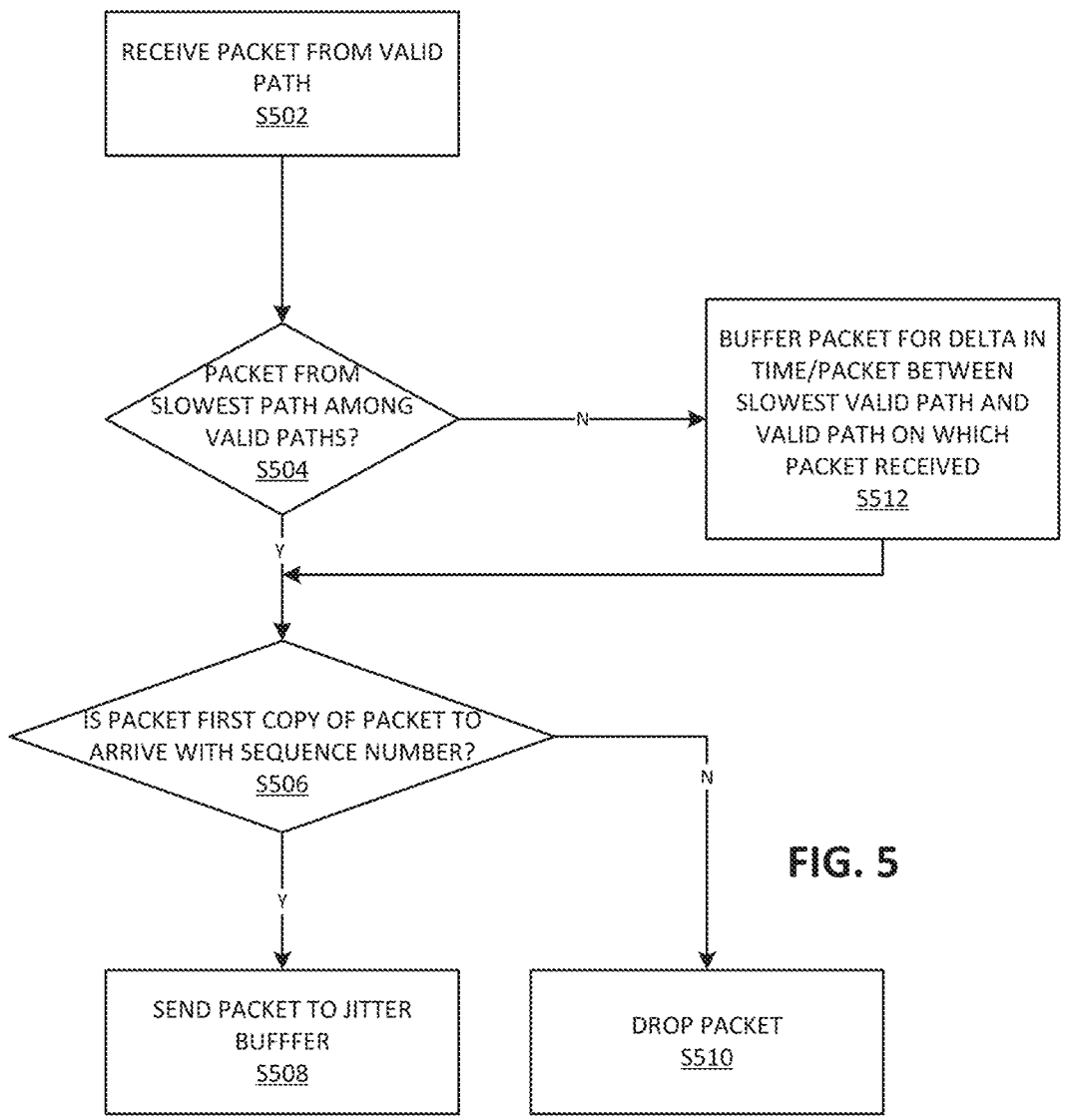
FIG. 5 is a flow chart illustrating another method according to one or more example embodiments.

FIG. 5 is a flow chart illustrating another method for controlling asymmetry in a TDM system, according to one or more example embodiments.

In the method shown in FIG. 5, the faster of the multiple paths between nodes may be buffered by an amount equal to an average latency difference between the paths. The combiner performs an initial analysis to determine an average latency difference between the paths, and to determine which of the paths has the lower latency (the faster path). In one example, the combiner may determine the average latency, and which is the faster path, based on receipt of (e.g., thousands) of packets over time (e.g., using sent and receive timestamps).

As mentioned above, each packet on each path may contain a shim header with a transmit timestamp. In this case, the receive timestamp for each received packet may be observed, and the combiner may calculate the average delay on each path as well as the differential delay. In another example, the combiner may compute the differential delay as the difference between the received timestamps for packets having identical sequence numbers, but received on different paths.

Referring to FIG. 5, at S502, the combiner 103R receives a copy of a TDM packet on path Path_1 between the nodes 10L and 10R.

At S504, the combiner 103R determines whether path Path_1 is the slowest path among paths Path_1 and Path_2.

The combiner 103R may determine whether path Path_1 is the slowest path based on, for example, the average latency differences discussed above.

If the combiner 103R determines that path Path_1 is the slowest path, then at S506 the combiner 103R determines whether the packet is the first packet to arrive with the given sequence number.

If the received copy of the packet is the first copy of the packet (first packet with a given sequence number), then at S508 the combiner 103R sends the copy of the packet to the jitter buffer 102R.

Returning to S506, if the received copy of the packet is not the first copy of the packet to be received, then at S510 the combiner 103R drops or discards the copy of the packet.

Returning now to S504, if the combiner 103R determines that path Path_1 is not the slowest path among the valid paths, then at S512 the combiner 103R buffers the received copy of the packet for a period equal to the difference (or delta) in time (or packet) between the slowest valid path (e.g., path Path_2) and path Path_1. In one example, the combiner 103R may buffer the received copy of the packet for a period equal to the determined average latency difference between paths Path_1 and Path_2. The process then (e.g., upon expiration of the buffer period) proceeds to S506 and continues as discussed herein.

The jitter buffer 102R then performs ADC analysis and provides adjustments as necessary in the startup mode, and then enters normal mode, as discussed above.

One or more example embodiments also provide a full signaling solution for startup and/or recovery after failure of one or more active multipaths.

As mentioned above, each packet on each path may contain a shim header including, among other things, a transmit timestamp. In addition to that discussed above, the addition of the shim header to each (e.g., TDM PW) packet may establish a messaging channel between nodes connected by one or more active paths. In addition to the transmit timestamp, the shim header may contain various information such as number of paths on which the source (or transmitting) node is actively receiving packets (N-PATHS), a list of unique path identifiers (LIST)(UPI-1 . . . UPI-N) for the node, a unique node identifier (UNI) for the node, a current state of the combiner (STATE) at the node, one or more timestamps (TS) (e.g., 80 bits epoch time with UTC reference), or the like.

Each packet may contain this information, which may be used in the startup mode under normal operation, to recover after network issues that cause, for example, jitter buffer underrun, to calculate the maximum latency, or to calculate the average differential delay between active paths.

As mentioned above, one or more example embodiments may utilize a master-slave relationship between routers. A master node may be identified so decisions may be undertaken by the master node. In one example, the master node may be identified through configuration or using the Unique Node Identifier (UNI) (e.g., the node having the smaller of the UNIs may be selected as the master node). For example purposes, example embodiments will be discussed with regard to node 10R in FIG. 1 being the master node. However, example embodiments should not be limited to this example.

Each of the nodes in the network may maintain a local state for the combiner, which may be implemented using a finite state machine (FSM) or the like. The node may exchange the local state of the combiner with peer nodes by changing the current state of the combiner (STATE) field in the shim header in each packet. Information regarding the state of peer nodes may be used by the master node for decisions during operation. Local states of the combiner include, for example, Start, WaitForFirstPath, Timeout, WaitForAllPaths, TimeoutReady, SuccessReady, Converging, ForwardActive. Each of these states and the transition therebetween will be discussed in more detail below.

Example methods for startup and/or recovery of a node will now be discussed with regard to FIGS. 7-11.

Figure 7:
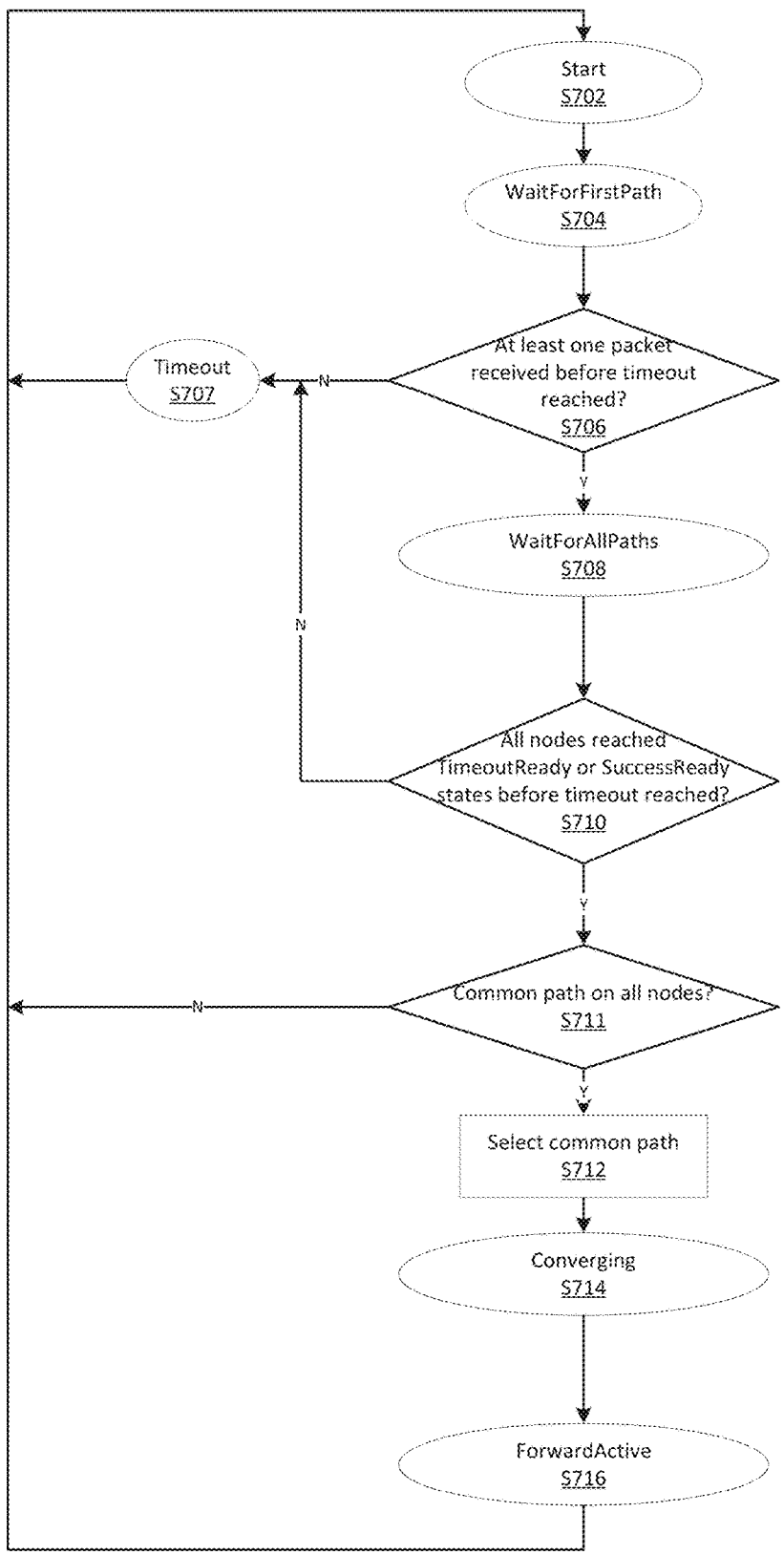
FIG. 7 is a hybrid state diagram and flow chart illustrating a method according to one or more example embodiments.

FIG. 7 is a flow chart illustrating a method for startup and/or recovery according to example embodiments.

Referring to FIG. 7, at S702 the combiner 103R enters the Start state, for example, after a reset, after initial configuration, after underrun of the jitter buffer 102R, etc.

In the Start state, combiner 103 and/or node 10R performs startup actions, such as initializing the network processor with regard to service traffic management, connect type, counters, states, logs, etc.

Once the startup actions are completed, the combiner 103R transitions to the WaitforFirstPath state at S704.

In the WaitForFirstPath state, the combiner 103R waits to receive one or more packets via one of paths Path_1 and Path_2 (or more generally N paths) configured for service between the nodes 10L and 10R. The combiner 103R may determine the path over which a packet is received based on a UPI identifying the path included in the packet header.

If the combiner 103R does not receive at least one packet via one of paths Path_1 or Path_2 before expiration of a timeout interval, then the combiner 103R transitions to the Timeout state at S707. The timeout interval may be user configurable (e.g., between about 1 ms and 500 ms). Once the Timeout state is reached, special actions may be performed to transition back to the Start state. Special actions include, for example, raise alarms, logs, increment stats, etc.

Returning to step S706, if the combiner 103R receives one or more packets from one of paths Path_1 or Path_2 before the timeout interval expires, then the combiner 103R transitions from the WaitForFirstPath state to the WaitForAllPaths state at S708.

In the WaitForAllPaths state the combiner 103R waits to receive packets on the other of paths Path_1 and Path_2 (or more generally the rest of the N-1 configured paths, each of which is identified with a UPI).

From the WaitForAllPaths state, the combiner 103R may transition to the TimeoutReady state or the SuccessReady state. The combiner 103R transitions from the WaitForAllPaths state to the TimeoutReady state if packets are not received on all of paths Path_1 and Path_2 (or more generally all of the N paths) before expiration of a timeout interval. The timeout interval may be user configurable, and may have the same or a different length than the timeout interval discussed above. In one example, the combiner 103R may not receive any packets on any of the other paths before expiration of the timeout interval. In another example, the combiner 103R may receive packets on some, but not all, paths, before the expiration of the timeout interval.

On the other hand, the combiner 103R transitions from the WaitForAllPaths state to the SuccessReady state if packets are received on all paths between the nodes 10L and 10R before expiration of the timeout interval.

At S710, combiner 103R (at the master node) determines whether both combiners 103R and 103L have reached the TimeoutReady state or the SuccessReady state before expiration of the timeout interval. As mentioned above, the state of the combiner 103L may be communicated to the combiner 103R via the shim header included in each transmitted packet.

If the combiner 103R determines that at least one of the combiners 103R and 103L has not reached the TimeoutReady state or the SuccessReady state before expiration of the timeout interval, then the combiner 103R transitions to the Timeout state at S707 and continues as discussed above.

Returning to S710, if each of the combiners 103R and 103L reaches one of the TimeoutReady state or the SuccessReady state, then the combiner 103R updates the list of unique path identifiers LIST with the UPI of all active paths on which it is receiving packets. The combiner 103R also updates the number of paths (N-PATHs) on which node 10R is actively receiving packets. This information may not change further, even if packets are received on inactive paths after this point. Also at S710, the combiner 103L (slave node) updates the list of unique path identifiers LIST with the UPI of all active paths, and updates the number of paths (N-PATHs) on which node 10L is actively receiving packets.

At S711, combiner 103R determines whether there is at least one common path among the list of unique path identifiers LIST at each of the nodes 10R and 10L. In one example, combiner 103R determines whether at least one common path exists based on a comparison between the list of unique path identifiers for the nodes 10R and 10L.

If combiner 103R determines that there are no common paths among the lists of unique path identifiers, then the combiner 103R returns to the Start state at S702. Once the (slave) node 10L receives an indication that the combiner 103R has returned to the Start state (e.g., via the shim header of a transmitted packet), the combiner 103L also transitions back to the Start state.

Returning to S711, if the combiner 103R determines that at least one common path exists between the nodes 10L and 10R, then at S712 the combiner 103R selects the one or more common paths from among the list of unique path identifiers LIST for transmission of packets between the nodes.

At S714, the combiner 103R transitions to the Converging state and updates the list of unique path identifiers LIST at node 10R with the chosen paths (UPIs). Once the (slave) node 10L receives an indication that the combiner 103R is in the Converging state (e.g., via the shim header of a transmitted packet), the combiner 103L also transitions to the Converging state and updates the list of unique path identifiers LIST accordingly.

Once each combiner transitions to the Converging state, the combiners 103R and 103L work (e.g., only) with the selected common paths, and data is transmitted to the respective jitter buffers 102R and 102L. At this point, both nodes 10R and 10L are using the same active path(s).

Once the activity to bring the jitter buffer in service is completed (e.g., leveling to the mid-point, by executing and completing an Asymmetry Delay Compensation (ADC) algorithm, etc.), the combiners 103R and 103L transition from the Converging state to the ForwardActive state at S716, where received traffic is processed accordingly. The ForwardActive state is the normal working state for the service, wherein traffic flows from one end of the network to the other to exchange data between endpoint devices 20L and 20R.

In the ForwardActive state, if more than one path is selected in the Converging state, then the service between the nodes is protected with redundant paths. Accordingly, if one of the paths is lost, traffic will not be affected, and the service will be maintained. Any lost path(s) may resume service at any time and the service will remain unaffected and again become protected with redundant paths.

If only one path is selected in the Converging state, when that single path is lost, traffic will be affected and hence the service will be affected (e.g., immediately) and the jitter buffer will underrun. In this case, the combiners (and nodes) may return to the Start state.

According to one or more example embodiments, at any point before the ForwardActive state, if one or more paths are lost or other types of errors occur, the combiner may return to the Start state and notify the peer node. The peer node may perform any appropriate actions such as logging, and then also transition back to the Start state in response to the notification.

Figure 8:
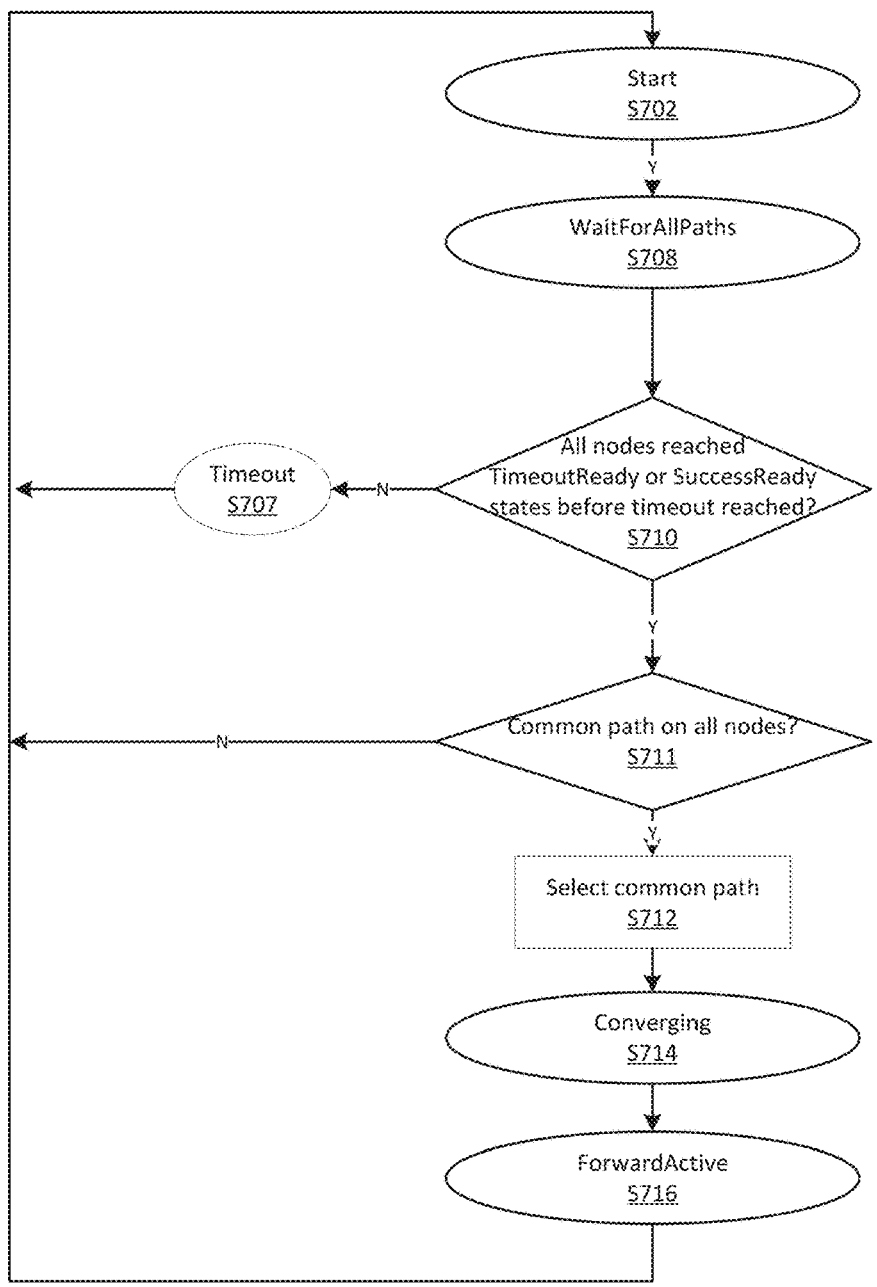
FIG. 8 is a hybrid state diagram and flow chart illustrating another method according to one or more example embodiments.

FIG. 8 is a flow chart illustrating another method for startup and/or recovery according to example embodiments.

Referring to FIG. 8, this example embodiment is similar to the example embodiment shown in FIG. 7, except that S704 and S706 are omitted. Thus, in this example embodiment, once combiner 103R completes the startup actions at S702, the combiner 103R transitions to the WaitForAllPaths state at S708, rather than the WaitForFirstPath state at S704 in FIG. 7. Because the additional steps shown in FIG. 8 are discussed above, a detailed discussion is not repeated here for the sake of brevity.

Figure 9:
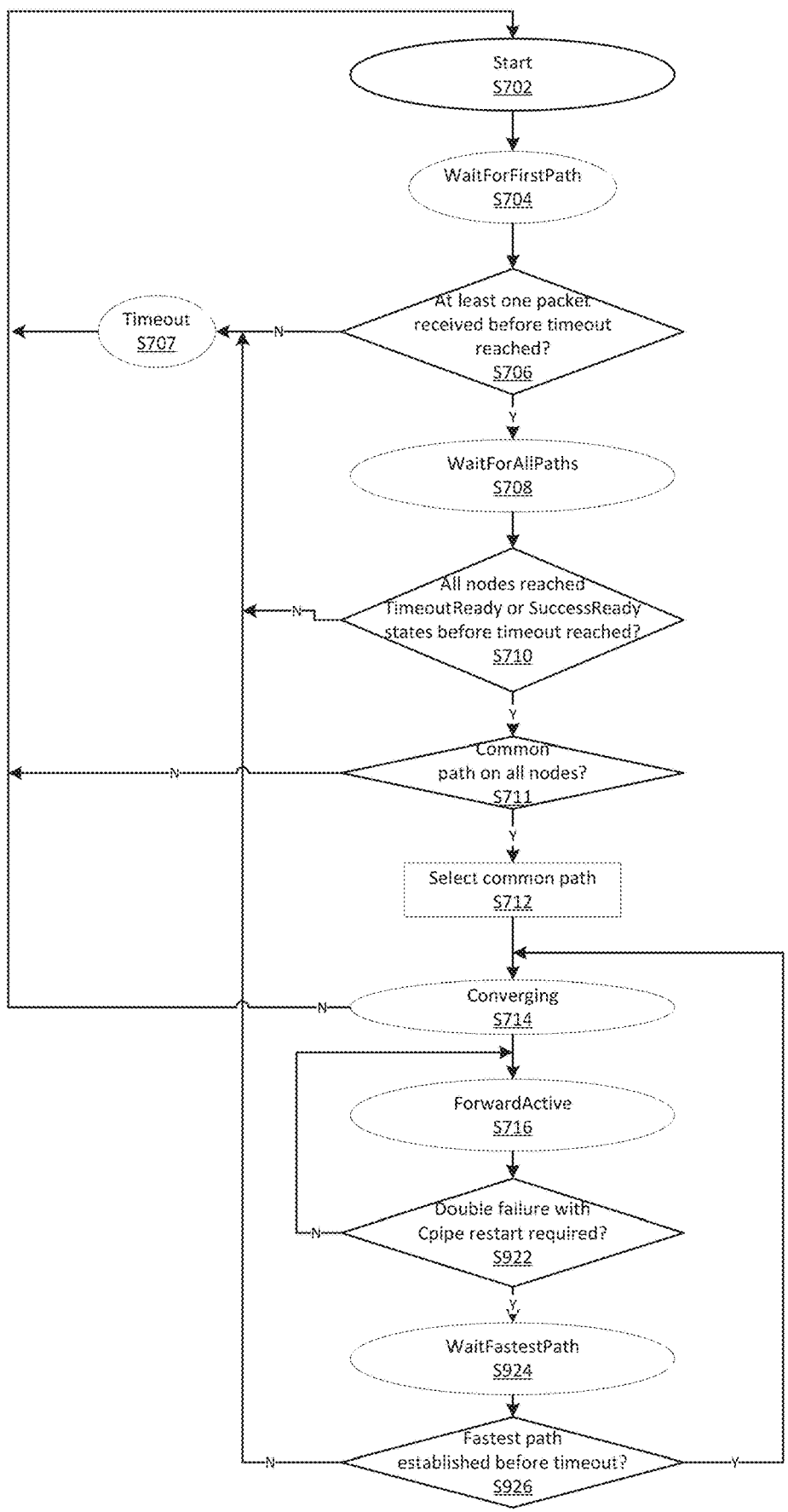
FIG. 9 is a hybrid state diagram and flow chart illustrating yet another method according to one or more example embodiments.

FIG. 9 illustrates another method for startup and/or recovery according to example embodiments.

Referring to FIGS. 9, S702, S704, S706, S707, S708, S710, S711, S712, S714 and S716 are the same or substantially the same as that discussed above with regard to FIG. 7, and thus, on the differences between the steps in FIGS. 7 and 9 will be discussed for the sake of brevity.

Referring to FIG. 9, in the WaitForAllPaths state at S708, in addition to the functions discussed above with regard to FIG. 7, the combiner 103R may also note the fastest path among the list of unique path identifiers.

Additionally, once in the ForwardActive state at S716 (normal state with TDM service up and traffic flowing), in response to detecting a double failure (e.g., with TDM PW restart required) at either node 10L or 10R (S922), the combiner 103R transitions to the WaitFastestPath state at S924.

In the WaitFastestPath state, the combiner 103R waits for the fastest path from among the list of unique path identifiers (e.g., as determined based on information in the shim header and noted at S708) to re-establish between node 10R and 10L. In one example, the combiner 103R determines that the fastest path has been re-established by recognizing that a packet has arrived via the fastest path after the failure. As discussed above, the fastest path is identified prior to the failure and stored in memory.

If the fastest path is not re-established between the nodes 10R and 10L before expiration of a timeout interval (S926), then the combiner 103R transitions to the Timeout state at S707. The timeout interval may be user configurable (e.g., between about 1 ms and 500 ms) and may have the same or a different length as the timeout intervals discussed above. As discussed above with regard to FIG. 7, once the Timeout state is reached, special actions may be performed to transition back to the Start state.

Returning to S926, if the fastest path is re-established between the nodes 10R and 10L before expiration of the timeout interval, then the combiner 103R (and the combiner 103L) return to the Converging state and the process continue as discussed herein.

Figure 10:
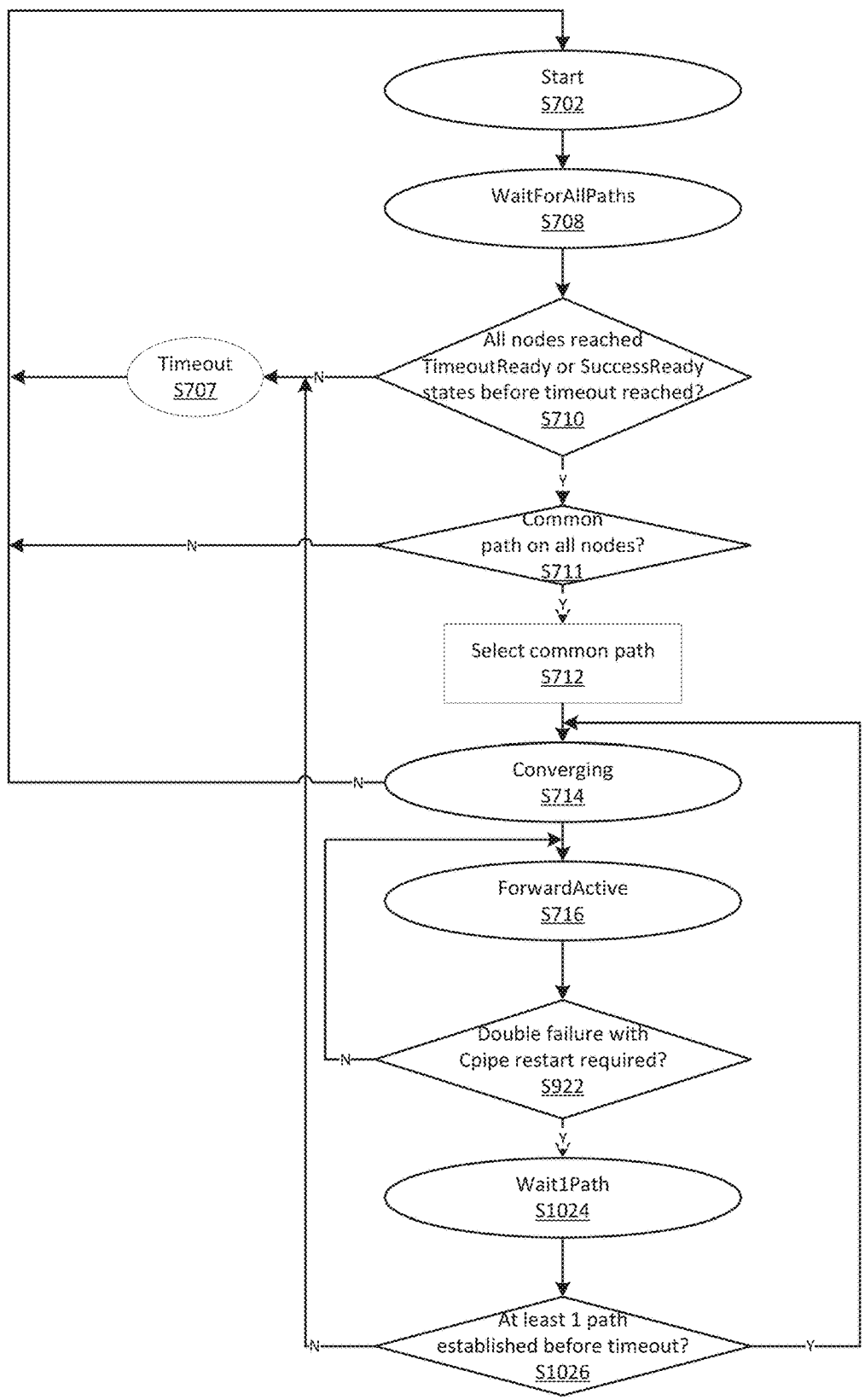
FIG. 10 is a hybrid state diagram and flow chart illustrating yet another method according to one or more example embodiments.

FIG. 10 illustrates another method for startup and/or recovery according to example embodiments.

Referring to FIGS. 10, S702, S707, S708, S710, S711, S712, S714 and S716 are similar to or the same as that discussed above with regard to FIG. 8, and thus, only differences with be discussed here for the sake of brevity.

In addition to the functionality discussed above with regard to FIG. 8, in the Converging state at S714 in FIG. 10, the node 10R may perform ADC analysis for each of the active paths, and note the relative difference of the jitter buffer delay for each path to facilitate adjustment after a failure (e.g., double failure with TDM PW restart required) in the event that the path that is re-established after the failure is not the fastest path among the paths between nodes 10L and 10R. This will be discussed in more detail later with regard to FIG. 11.

Additionally, once in the ForwardActive state at S716 (normal state with TDM service up and traffic flowing), in response to detecting a double failure with TDM PW restart required at either node 10L or 10R (S922), the combiner 103R transitions to the Wait1Path state at S1024.

In the Wait1Path state, the combiner 103R waits for at least one path from among the list of unique path identifiers (e.g., as determined based on information in the shim header) to re-establish between node 10R and 10L. As discussed similarly above, the combiner 103R determines that a path has been re-established by when a packet is received on the given path after the failure.

If at least one path is not re-established between nodes 10R and 10L before expiration of a timeout interval (S1026), then the combiner 103R transitions to the Timeout state at S707. The timeout interval may be user configurable (e.g., between about 1 ms and 500 ms) and may have the same or a different length as the timeout intervals discussed above. As discussed above with regard to FIG. 7, once the Timeout state is reached, special actions may be performed to transition back to the Start state.

Returning to S1026, if at least one path is re-established between nodes 10R and 10L before expiration of a timeout interval, then the combiner 103R (and the combiner 103L) returns to the Converging state and the process continues as discussed herein.

Figure 11:
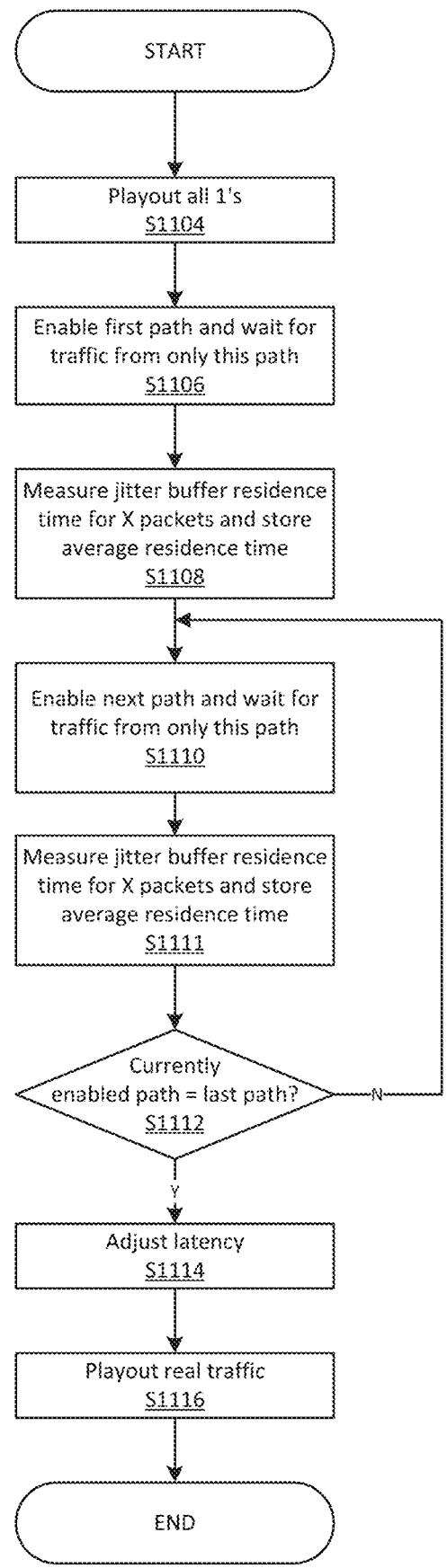
FIG. 11 is a flow chart illustrating yet another method according to one or more example embodiments.

FIG. 11 illustrates a method for computing jitter buffer latency for paths in the Converging state according to example embodiments. For example purposes, the example embodiment shown in FIG. 11 will be discussed with regard to node 10R, and components thereof.

Referring to FIG. 11, S1104 all 1's are played out by a device (e.g., a framer, a line interface unit, ucode, etc.) situated after the jitter buffer 102R.

At S1106, node 10R enables a first path among the list of unique path identifiers and waits for traffic from this enabled path.

Upon receive of traffic on the enabled path, at S1108 node 10R measures the jitter buffer residence time for the received packets (e.g., X packets), and stores the average residence time in a memory (e.g., in association with the corresponding unique path identifier for the path) at node 10R. The jitter buffer residence time (Tres) for a packet refers to the difference between the time-stamp (Tout) on egress of the packet out of the jitter buffer (Tout) and the time-stamp (Tin) on ingress of the packet into the jitter buffer (i.e., Tres=Tout−Tin).

At S1110, node 10R enables a next path among the list of unique path identifiers and waits for traffic from this enabled path.

Upon receipt of traffic on the enabled path, at S1111 node 10R measures the jitter buffer residence time for the received packets (e.g., X packets) on the enabled path, and stores the average residence time in the memory (e.g., in association with the corresponding unique path identifier for the path) at node 10R.

At S1112, node 10R determines whether the currently enabled path is the last path in the list of unique path identifiers.

If the currently enabled path is not the last path in the list of unique path identifiers, then the process returns to step S1110 and continues as discussed herein.

Returning to S1112, if the currently enabled path is the last path in the list of unique path identifiers, then at S1114 node 10R adjusts the jitter buffer latency based on the difference between the average residence time of the fastest path and the engineered latency. In one example, node 10R may adjust the jitter buffer latency by dropping or adding dummy data (e.g., an exact number of octets). The engineered latency refers to the half-filled point in the jitter buffer, which may be calculated. Because of jitter in the network, at startup, the jitter buffer may be off of this level (e.g., half-filled/engineered latency). Through ADC analysis, the amount of adjustment needed may be calculated, and adjustment to the engineered latency (half full) may be made.

Figure 6:
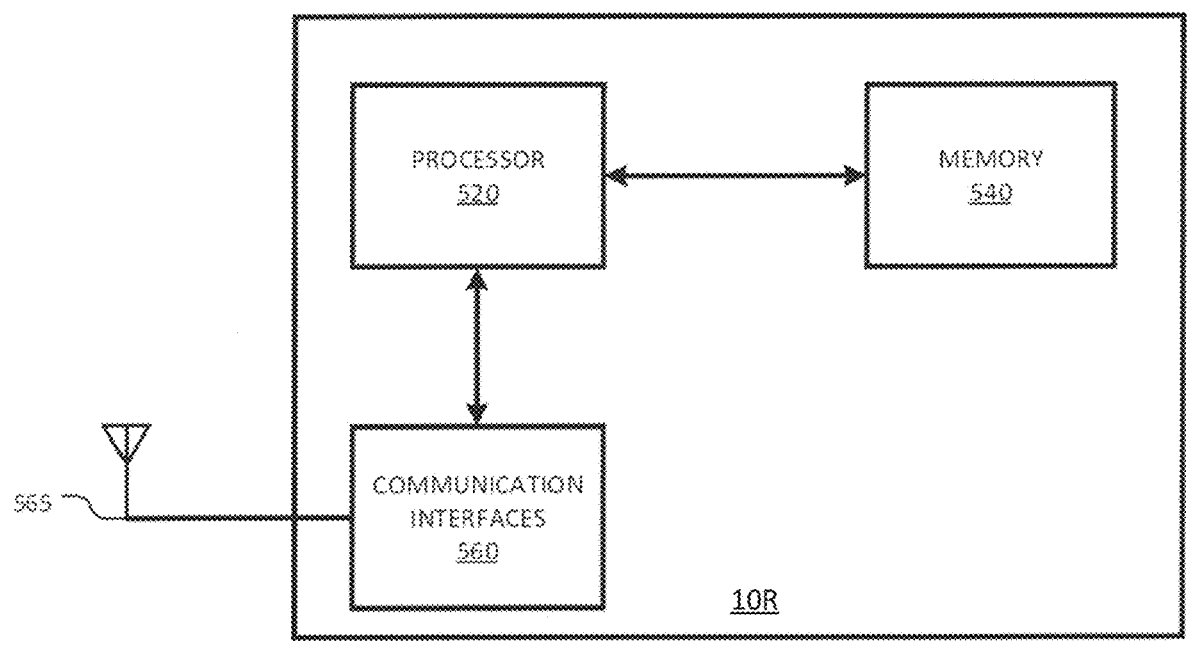
FIG. 6 illustrates an example embodiment of a node shown in FIG. 1.

FIG. 6 illustrates an example embodiment of a node (e.g., node 10R and/or 10L) shown in FIG. 1. The node may serve as node 10R and/or 10L shown in FIG. 1. For the sake of brevity, however, FIG. 6 will be described with regard to node 10R.

As shown, node 10R includes: a memory 540; a processor 520 connected to the memory 540; and various communication interfaces 560 connected to the processor 520. In at least some instances, node 10R may include one or more (e.g., a plurality of) antennas or antenna panels 565 connected to the various communication interfaces 560. The various communication interfaces 560 and the antenna 565 may constitute a transceiver for transmitting/receiving data from/to other network elements (e.g., destination endpoints or devices, other routers, other network elements, etc.). Although an antenna is shown in FIG. 6, the antenna may be omitted, and the communication interfaces may be wired (e.g., fiber optics, ethernet links, tdm link or serial/legacy interfaces, etc.).

As will be appreciated, depending on the implementation of the router, the router may include many more components than those shown in FIG. 6. For example, the router 10R may include components involved in Circuit Emulation Service over Packet (CESoP) operations, such as a teleprotection supporter (e.g., as part of the processor 520), a CESoP processor to control CESoP functions of the router, a packet transmit/receive function including a packet switch and interfaces and a TDM transmit/receive function in communication with a TDM endpoint device. The CESoP processor may include a TDM interworking function. However, it is not necessary that all of these generally conventional components be shown in order to disclose the illustrative example embodiment.

The memory 540 may be a computer readable storage medium that generally includes a random access memory (RAM), read only memory (ROM), and/or a permanent mass storage device, such as a disk drive. The memory 540 may include a buffer memory, which may further include the jitter buffer discussed herein. The memory 540 also stores an operating system and any other routines/modules/applications for providing the functionalities of the network element (e.g., functionalities of node, router, other network element, methods according to the example embodiments, etc.) to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 may be configured to carry out instructions of a computer program by performing the arithmetical, logical, and input/output operations of the system. Instructions may be provided to the processor 520 by the memory 540.

The various interfaces 560 may include components that interface the processor 520 with the antenna 565, other input/output components, or other wireline transmission systems, interfaces or protocols (e.g., fiber optics, ethernet links, tdm link or serial/legacy interfaces, etc.). As will be understood, the various interfaces 560 and programs stored in the memory 540 to set forth the special purpose functionalities of the network element will vary depending on the implementation of node 10R.

The interfaces 560 may also include one or more user input devices (e.g., a keyboard, a keypad, a mouse, or the like) and user output devices (e.g., a display, a speaker, or the like).

Although only a single processor, memory and communication interface is shown in FIG. 6, it should be understood that a node may include many processors, many memories and many communication interfaces.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing nodes, routers or other network element or apparatus. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, nodes, routers, other network elements, network apparatuses, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A network element to enable use of multiple active paths for time division multiplexing (TDM) traffic over a packet switched network, the network element comprising:
   at least one processor; and
   at least one memory including computer program code, the at least one memory and the computer program code configured to, with the at least one processor, cause the network element to
   receive at least two copies of a replicated packet including TDM information via at least two paths through the packet switched network, the at least two copies of the replicated packet including at least a first copy of the replicated packet received via a first of the at least two paths, and a second copy of the replicated packet received via a second of the at least two paths,
   select a copy of the replicated packet from among the at least two copies of the replicated packet,
   input the selected copy of the replicated packet to a jitter buffer,
   discard unselected ones of the at least two copies of the replicated packet, and
   output the selected copy of the replicated packet from the jitter buffer to a TDM endpoint device.

2. The network element of claim 1, wherein the at least one memory and the computer program code is configured to, with the at least one processor, cause the network element to select the copy of the replicated packet based on a time of receipt of the at least two copies of the replicated packet.

3. The network element of claim 2, wherein
   the first copy of the replicated packet is received prior to the second copy of the replicated packet; and
   the at least one memory and the computer program code is configured to, with the at least one processor, cause the network element to select the first copy of the replicated packet as the selected copy of the replicated packet.

4. The network element of claim 2, wherein
   the first copy of the replicated packet is a first instance of the replicated packet received at the network element, and
   the at least one memory and the computer program code is configured to, with the at least one processor, cause the network element to select the first copy of the replicated packet as the selected copy of the replicated packet.

5. The network element of claim 1, wherein the at least one memory and the computer program code is configured to, with the at least one processor, cause the network element to select the copy of the replicated packet, from among the at least two copies of the replicated packet, after receipt of all of the at least two copies of the replicated packet.

6. The network element of claim 1, wherein each of the at least two copies of the replicated packet have the same sequence number.

7. The network element of claim 1, wherein at least the first copy of the replicated packet includes a shim header, the shim header including at least one of a number of the at least two paths through the packet switched network, a list of unique path identifiers for the at least two paths through the packet switched network, a unique node identifier (UNI) for a node having transmitted the first copy of the replicated packet, and a current state of the node having transmitted the first copy of the replicated packet.

8. The network element of claim 1, wherein the at least one memory and the computer program code is configured to, with the at least one processor, cause the network element to
   determine whether the first of the at least two paths has a highest latency among the at least two paths,
   buffer the first copy of the replicated packet in response to determining that the first of the at least two paths does not have the highest latency among the at least two paths, determine whether the buffered first copy of the replicated packet is first instance of the replicated packet received at the network element, and select the buffered first copy of the replicated packet as the selected copy in response to determining that the buffered first copy of the replicated packet is the first instance of the replicated packet received at the network element.

9. The network element of claim 8, wherein the at least one memory and the computer program code is configured to, with the at least one processor, cause the network element to buffer the first copy of the replicated packet for a time equal to a difference between the highest latency and a minimum latency among the at least two paths.

10. The network element of claim 1, wherein the at least one memory and the computer program code is configured to, with the at least one processor, cause the network element to determine whether the first of the at least two paths has a highest latency among the at least two paths, determine whether the first copy of the replicated packet is a first instance of the replicated packet received at the network element in response to determining that the first of the at least two paths has the highest latency among the at least two paths, and select the first copy of the replicated packet as the selected copy in response to determining that the first copy of the replicated packet is the first instance of the replicated packet received at the network element.

11. A non-transitory computer-readable storage medium storing computer-executable instructions that, when executed by at least one processor at a network element, cause the network element to perform a method for enabling enable use of multiple active paths for time division multiplexing (TDM) traffic over a packet switched network, the method comprising:

receiving at least two copies of a replicated packet including TDM information via at least two paths through the packet switched network, the at least two copies of the replicated packet including at least a first copy of the replicated packet received via a first of the at least two paths, and a second copy of the replicated packet received via a second of the at least two paths;

selecting a copy of the replicated packet from among the at least two copies of the replicated packet;

inputting the selected copy of the replicated packet to a jitter buffer;

discarding unselected ones of the at least two copies of the replicated packet; and outputting the selected copy of the replicated packet from the jitter buffer to a TDM endpoint device.

12. The non-transitory computer-readable storage medium of claim 11, wherein the selecting selects the copy of the replicated packet based on a time of receipt of the at least two copies of the replicated packet.

13. The non-transitory computer-readable storage medium of claim 12, wherein the first copy of the replicated packet is received prior to the second copy of the replicated packet; and the selecting selects the first copy of the replicated packet as the selected copy of the replicated packet.

14. The non-transitory computer-readable storage medium of claim 12, wherein the first copy of the replicated packet is a first instance of the replicated packet received at the network element, and the selecting selects the first copy of the replicated packet as the selected copy of the replicated packet.

15. The non-transitory computer-readable storage medium of claim 11, wherein the selecting selects the copy of the replicated packet, from among the at least two copies of the replicated packet, after receipt of all of the at least two copies of the replicated packet.

16. The non-transitory computer-readable storage medium of claim 11, wherein each of the at least two copies of the replicated packet have the same sequence number.

17. The non-transitory computer-readable storage medium of claim 11, wherein at least the first copy of the replicated packet includes a shim header, the shim header including at least one of a number of the at least two paths through the packet switched network, a list of unique path identifiers for the at least two paths through the packet switched network, a unique node identifier (UNI) for a node having transmitted the first copy of the replicated packet, and a current state of the node having transmitted the first copy of the replicated packet.

18. The non-transitory computer-readable storage medium of claim 11, wherein the method further comprises:

determining whether the first of the at least two paths has a highest latency among the at least two paths;

buffering the first copy of the replicated packet in response to determining that the first of the at least two paths does not have the highest latency among the at least two paths;

determining whether the buffered first copy of the replicated packet is a first instance of the replicated packet received at the network element; and selecting the buffered first copy of the replicated packet as the selected copy in response to determining that the buffered first copy of the replicated packet is the first instance of the replicated packet received at the network element.

19. The non-transitory computer-readable storage medium of claim 11, wherein the method further comprises:

determining whether the first of the at least two paths has a highest latency among the at least two paths;

determining whether the first copy of the replicated packet is a first instance of the replicated packet received at the network element in response to determining that the first of the at least two paths has the highest latency among the at least two paths; and selecting the first copy of the replicated packet as the selected copy in response to determining that the first copy of the replicated packet is the first instance of the replicated packet received at the network element.

20. A method for enabling enable use of multiple active paths for time division multiplexing (TDM) traffic over a packet switched network, the method comprising:

receiving at least two copies of a replicated packet including TDM information via at least two paths through the packet switched network, the at least two copies of the replicated packet including at least a first copy of the replicated packet received via a first of the at least two paths, and a second copy of the replicated packet received via a second of the at least two paths;

selecting a copy of the replicated packet from among the at least two copies of the replicated packet;

inputting the selected copy of the replicated packet to a jitter buffer;

discarding unselected ones of the at least two copies of the replicated packet; and outputting the selected copy of the replicated packet from the jitter buffer to a TDM endpoint device.

\* \* \* \* \*